United States Patent
Doebler et al.

(10) Patent No.: US 12,406,267 B2
(45) Date of Patent: Sep. 2, 2025

(54) SUPPLIER DATA VALIDATION USING VALIDATION SUBSYSTEM

(71) Applicant: Coupa Software Incorporated, San Mateo, CA (US)

(72) Inventors: Kathryn C. Doebler, Sewickley, PA (US); Oleksandr Mekhovov, Hamburg (DE); Faraz A. Qureshi, Astoria, NY (US); Ahmad Sadeddin, Daly City, CA (US); Kengsreng Tang, Hayward, CA (US); Himica Kumar, San Francisco, CA (US)

(73) Assignee: Coupa Software Incorporated, Foster City, CA (US)

( * ) Notice: Subject to any disclaimer, the term of this patent is extended or adjusted under 35 U.S.C. 154(b) by 0 days.

(21) Appl. No.: 17/186,900

(22) Filed: Feb. 26, 2021

(65) Prior Publication Data
US 2022/0277314 A1    Sep. 1, 2022

(51) Int. Cl.
| | |
|---|---|
| *G06Q 30/018* | (2023.01) |
| *G06F 16/23* | (2019.01) |
| *G06Q 20/10* | (2012.01) |
| *G06F 3/0481* | (2022.01) |

(52) U.S. Cl.
CPC ....... *G06Q 30/018* (2013.01); *G06F 16/2365* (2019.01); *G06Q 20/10* (2013.01); *G06F 3/0481* (2013.01)

(58) Field of Classification Search
CPC .............................. G06Q 30/018; G06Q 30/00
See application file for complete search history.

(56) References Cited

U.S. PATENT DOCUMENTS

| | | |
|---|---|---|
| 7,689,482 B2 | 3/2010 | Lam et al. |
| 7,742,985 B1 | 6/2010 | Digrigoli et al. |
| 7,970,671 B2 | 6/2011 | Hahn-Carlson et al. |
| 8,275,705 B2 * | 9/2012 | Katz ............... G06Q 20/389 |
| | | 705/40 |
| RE44,502 E | 9/2013 | Boesch et al. |

(Continued)

FOREIGN PATENT DOCUMENTS

WO    2008/042823    4/2008

*Primary Examiner* — Calvin L Hewitt, II
*Assistant Examiner* — Kevin T Poe
(74) *Attorney, Agent, or Firm* — Baker Botts L.L.P.

(57) ABSTRACT

A computer-implemented method for validating supplier data is provided. The method includes accessing a spend management interface of a spend management system. The spend management interface may receive supplier data from a supplier computer via user interface widgets of the spend management interface. A country identifier is received from the supplier computer via a country widget and a currency identifier is received via a currency widget of the user interface widgets. One or more parameters associated with the country identifier and currency identifier are identified within a validation database of the spend management system and customized user interface widgets are generated based on the one or more parameters. The spend management interface is electronically updated to present the customized user interface widgets to the supplier computer. Supplier data is received from the supplier computer via the customized user interface widgets and the supplier data is programmatically validated.

9 Claims, 6 Drawing Sheets

(56) References Cited

U.S. PATENT DOCUMENTS

| | | | |
|---|---|---|---|
| 10,489,753 B2 | 11/2019 | Allen-Rouman et al. | |
| 10,810,582 B2 | 10/2020 | Digrigoli et al. | |
| 11,311,797 B2* | 4/2022 | Rose | G06Q 20/385 |
| 2002/0153415 A1* | 10/2002 | Minami | G06Q 20/18 |
| | | | 235/380 |
| 2013/0151417 A1* | 6/2013 | Gupta | G06Q 20/382 |
| | | | 705/65 |
| 2014/0222594 A1* | 8/2014 | Rose | G06Q 20/385 |
| | | | 705/16 |
| 2015/0120512 A1* | 4/2015 | Chen | G06Q 30/0641 |
| | | | 705/27.1 |
| 2016/0054908 A1* | 2/2016 | Vegesna | G06F 3/04842 |
| | | | 715/716 |
| 2016/0071069 A1* | 3/2016 | Skala | G06Q 20/4016 |
| | | | 705/32 |
| 2016/0357526 A1* | 12/2016 | Soffer | G06F 8/36 |
| 2020/0094133 A1* | 3/2020 | Rose | G06Q 20/385 |
| 2020/0259903 A1* | 8/2020 | Momchilov | H04L 67/025 |
| 2021/0397681 A1* | 12/2021 | Boule | G06F 21/83 |

\* cited by examiner

SUPPLIER DATA VALIDATION USING VALIDATION SUBSYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2019-2020 Coupa Software Incorporated.

FIELD OF THE DISCLOSURE

One technical field of the present disclosure is computer-implemented supplier data validation using a validation subsystem. Another field is computer-implemented supplier data management using a validation subsystem. Yet another technical field is computer-implemented electronic presentation of customized user interface widgets via a spend management interface.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Computer-implemented software-as-a-service (SaaS) systems are now available for a variety of data processing applications. These systems typically offer complex, sophisticated internal data processing applications. For example, e-procurement or spend management systems have been developed to assist enterprises in tracking and planning purchasing and sourcing operations at high volume. Suppliers may use these systems to provide supplier bank account data, or "supplier data," to buyers for payment for goods or services. Specifically, suppliers may create respective digital repositories within spend management systems that digitally store the supplier data necessary for buyers to complete bank transactions. For example, such digital repositories may store supplier bank account details such as bank codes, routing numbers, account numbers, and/or other supplier data that buyers may use to address supplier bank accounts for bank account transactions.

Typically, suppliers may manually provide supplier data to spend management systems. For example, suppliers may manually enter supplier data into a spend management system by accessing one or more data fields electronically presented within a user interface of the spend management system using a supplier computer. However, such manual entry of supplier data—which may arrive at the spend management system in large quantities, such as thousands or millions of data entries—may be validated by spend management systems using a generic set of syntax requirements, often resulting in missing, incomplete, and/or incorrect supplier data being stored in the spend management system. Further, spend management systems may use the generic set of syntax requirements to validate supplier data uniformly across various countries and currency types.

However, using a generic set of syntax requirements to validate supplier data neglects to account for specific syntax requirements corresponding to a given country in which a supplier bank account is located and/or a given currency type associated with a supplier bank account transaction. For example, a supplier bank account located in the United States may require a routing number to complete a supplier bank account transaction using United States dollars (USD) while a supplier bank account located in Germany may require an International Bank Account Number (IBAN) to complete a supplier bank account transaction using euros (EUR). In this example, the spend management system may electronically present one or more data fields within a user interface accessed by a supplier computer that may, or may not, represent the specific syntax requirements corresponding to the country in which the supplier bank account is located and/or the given currency type associated with the supplier bank account transaction. Here, suppliers may manually enter inaccurate supplier data into the one or more data fields, which may result in failures to accurately integrate supplier data across multiple spend management systems accessed by buyers (e.g., enterprise resource planning (ERP) platforms) for making payments to suppliers. Inaccurate supplier data may additionally result in costly bounced payments from banks due to buyers attempting to use the inaccurate supplier data for supplier bank account transactions. Or, inaccurate supplier data may result in suppliers not receiving payments for products or services provided to buyers.

In some instances, inaccurate supplier data may be detected and mitigated by the buyer before payments are made. However, in an environment involving thousands to millions of suppliers located across multiple countries and requiring various currency types, merely detecting the inaccurate supplier data becomes a time-consuming, complex problem. Wide variances in bank account transaction requirements for respective countries and currency types mean that buyers may be motivated to introduce new mechanisms for supplier data validation (e.g., third-party software), thereby exposing sensitive data which presents opportunities for fraud and/or additional disruptions in supplier bank account transactions. Furthermore, the use of inaccurate supplier data for bank account transactions invariably causes the systems involved in implementing an e-procurement system, such as server instances and client computers, to use excess amounts of computing resources such as CPU cycles, storage, memory, and/or network bandwidth that may be avoidable. Thus, there is a need for ways to electronically present one or more data fields within a user interface of a spend management system accessed by supplier computers that each represent the specific syntax requirements corresponding to the country in which a supplier bank account is located and/or the given currency type associated with a supplier bank account transaction. Such specific syntax requirements may be used to validate supplier data entered manually into the one or more data fields by suppliers, thereby substantially reducing the time and complexity involved in validating supplier data stored in database records of a spend management system.

SUMMARY OF THE INVENTION

The appended claims may serve as a summary of the invention.

BRIEF DESCRIPTION OF THE DRAWINGS

In the drawings:

FIG. 2A, FIG. 2B, FIG. 2C illustrate an example spend management interface of a spend management system, according to various embodiments.

FIG. 3A, FIG. 3B illustrate an example spend management interface that includes an error notification, according to various embodiments.

DETAILED DESCRIPTION OF EXAMPLE EMBODIMENTS

Figure 1:
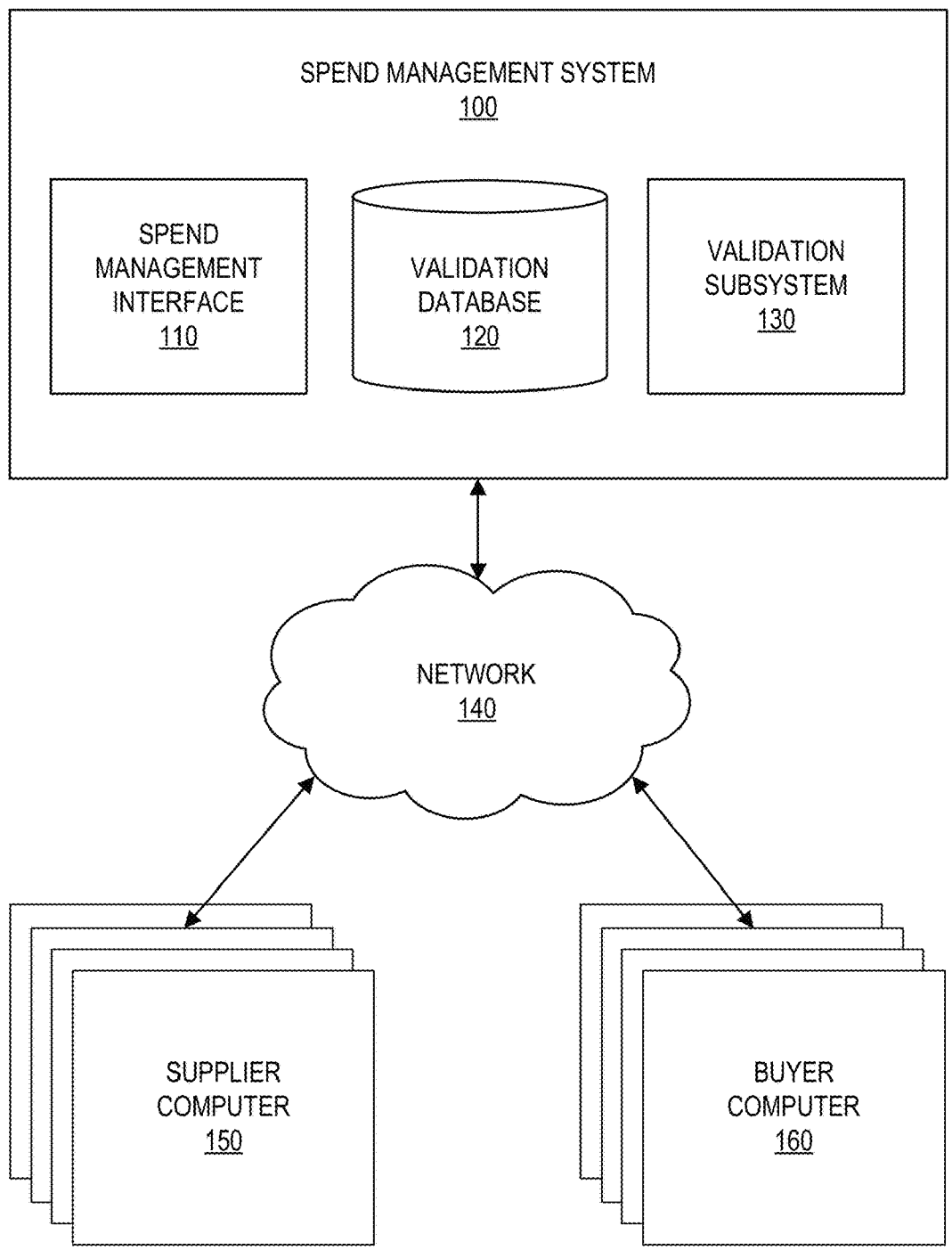
FIG. 1 is a block diagram of an example networked computer system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described herein in sections according to the following outline:

1. General Overview
2. Structural Overview
2.1 Example Distributed Computer System
2.2 User Interface Example
2.3 Supplier Data Validation Example
3. Functional Overview
4. Implementation Example—Hardware Overview
5. Benefits; Extensions and Alternatives

1. General Overview

Techniques for validating and managing supplier data using a validation subsystem are described herein. According to an embodiment, the validation subsystem may access a spend management interface of a spend management system. The spend management interface may be programmed to receive supplier data from a supplier computer via one or more user interface widgets of the spend management interface. The validation subsystem may receive a country identifier from the supplier computer via a country widget of the one or more user interface widgets. The country identifier may indicate a country in which a supplier bank account is located. The validation subsystem may receive a currency identifier from the supplier computer via a currency widget of the one or more user interface widgets. The currency identifier may indicate a currency type associated with a supplier bank account transaction. The validation subsystem may identify one or more parameters of bank account data parameters stored in a validation database of the spend management system. The one or more parameters may be associated with the country identifier and the currency identifier. The validation subsystem may generate one or more customized user interface widgets based on the one or more parameters. The one or more customized user interface widgets may be associated with all data values of the supplier data necessary to correctly address the supplier bank account for the supplier bank account transaction. The validation subsystem may electronically update the spend management interface to present the one or more customized user interface widgets to the supplier computer and may receive the supplier data from the supplier computer via the one or more customized user interface widgets. The validation subsystem may then programmatically validate the supplier data.

In an embodiment, a method comprises, using a validation subsystem of a computer-implemented spend management system, accessing a spend management interface of the spend management system, the spend management interface being programmed to receive supplier data from a supplier computer via one or more user interface widgets of the spend management interface; receiving a country identifier from the supplier computer via a country widget of the one or more user interface widgets, the country identifier indicating a country in which a supplier bank account is located; receiving a currency identifier from the supplier computer via a currency widget of the one or more user interface widgets, the currency identifier indicating a currency type associated with a supplier bank account transaction; identifying one or more parameters of a plurality of bank account data parameters stored in a validation database of the spend management system, the one or more parameters associated with the country identifier and the currency identifier; generating one or more customized user interface widgets based on the one or more parameters, the one or more customized user interface widgets being associated with all data values of the supplier data necessary to correctly address the supplier bank account for the supplier bank account transaction; electronically updating the spend management interface to present the one or more customized user interface widgets to the supplier computer; receiving the supplier data from the supplier computer via the one or more customized user interface widgets; and programmatically validating the supplier data.

2. Structural Overview

2.1 Example Distributed Computer System

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the spend management system 100.

FIG. 1 is a block diagram of an example networked computer system in which various embodiments may be practiced. In the embodiment illustrated in FIG. 1, a networked computer system 170 comprises a spend management system 100, supplier computers 150 (individually referred to herein as "supplier computer 150"), and buyer computers 160 (individually referred to herein as "buyer computer 160"), which are communicatively coupled directly or indirectly via network 140. The spend management system 100 may include a spend management interface 110, a validation database 120, and a validation subsystem 130 which are communicatively coupled via one or more direct or indirect digital electronic network links, using any of wired or wireless, terrestrial or satellite network links, internetworks, and infrastructure gear. The spend management system 100, supplier computers 150, buyer computers 160, and other elements of the networked computer system 170 may each comprise an interface compatible with the network 140 and are programmed or configured to use standardized protocols for communication across the networks such as TCP/IP, Bluetooth, and higher-layer protocols such as HTTP, TLS, and the like. FIG. 1 is shown in simplified, schematic format for purposes of illustrating a clear example and other embodiments may include additional, fewer, and/or different elements.

The computing devices such as the supplier computers 150 and buyer computers 160 may comprise a desktop computer, laptop computer, tablet computer, smartphone, or any other type of computing device that allows access to the spend management system 100. In one embodiment, suppliers may access the spend management system 100 using the supplier computers 150 to provide supplier data for receiving payments from buyers associated with buyer computers 160 (e.g., companies, private entities, business enterprises, and the like). Specifically, the supplier computers 150 may access the spend management system 100 (e.g., via spend management interface 110) such that suppliers may manually provide the supplier data necessary for buyers to address supplier bank accounts for completing bank account transactions. For example, suppliers may manually provide supplier data to the spend management system 100 such as bank codes, routing numbers, and/or account numbers. Buyers may use respective buyer computers 160 to access supplier data stored in the spend management system 100 and to use the supplier data for completing bank account transactions accordingly. In one embodiment, supplier computers 150 may provide inaccurate supplier data for buyers associated with buyer computers 160. That is, a supplier may provide inaccurate supplier data to buyers inadvertently by manually entering supplier data into the spend management system 100.

In one embodiment, the spend management system 100 may be programmed or configured for generating electronic pages, alerts, notifications, hyperlinks, recommendations, or application protocol messages to output to the computing devices such as the supplier computers 150 or buyer computers 160. For example, spend management system 100 may be programmed to generate dynamic web pages that implement an application as a software-as-a-service (SaaS) application that the supplier computer 150 and buyer computer 160 may access using a web browser hosted at the computing device. In one embodiment, the spend management system 100 may be programmed to generate a dynamic web page (e.g., spend management interface 110) used to electronically present supplier data to supplier computers 150 and/or buyer computers 160. Specifically, the spend management system 100 may be programmed to receive supplier data from supplier computers 150 and to programmatically validate the supplier data such that buyer computers 160 may access the validated supplier data to complete bank account transactions. In one embodiment, the spend management system 100 may be implemented using a server-class computer or other computers having one or more processor cores, co-processors, or other computers. Spend management system 100 may be a physical server computer and/or a virtual server instance stored in a data center, such as through cloud computing.

In one embodiment, the spend management interface 110 may comprise a system, device, or apparatus generally operable to electronically receive and present supplier data to supplier computers 150 and/or buyer computers 160. In particular, spend management interface 110 may be or include a dynamic web page that electronically presents one or more data fields, or "user interface widgets," to supplier computers 150 such that suppliers may manually enter supplier data into the spend management system 100. In one embodiment, respective suppliers may manually provide, indicate, or otherwise specify, a country in which payments are to be received using the user interface widgets electronically presented within the spend management interface 110. Specifically, respective suppliers may indicate a country in which a supplier bank account is located by providing the name of the country, or a "country identifier," into a data field configured to receive the country identifier, or a "country widget," of the user interface widgets electronically presented within the spend management interface 110. In another embodiment, respective suppliers may manually provide, indicate, or otherwise specify, a currency type in which payments are to be received using the user interface widgets electronically presented within the spend management interface 110. In particular, respective suppliers may indicate a currency type associated with a supplier bank account transaction by providing the name of the currency, or a "currency identifier," into a data field configured to receive the currency identifier, or a "currency widget," of the user interface widgets electronically presented with the spend management interface 110. The spend management system 100 may be programmed to receive the supplier data provided by supplier computers 150 via the spend management interface 110 and to programmatically validate the supplier data such that buyers may use the supplier data for completing bank account transactions accordingly.

In one embodiment, the spend management interface 110 may additionally include one or more icons, or "hint icons," disposed proximate to one or more user interface widgets. Each hint icon electronically presented within the spend management interface 110 may be programmed to provide suppliers with hints, or "suggestions," regarding proper syntax, format, and/or length of supplier data to be manually entered by suppliers. Each suggestion provided to suppliers using hint icons may correspond to the user interface widget next to which the hint icon is presented. Hint icons are described in further detail with respect to FIG. 2B.

In one embodiment, the validation database 120 may comprise a system, device, or apparatus generally operable to digitally store one or more parameters, or "bank account data parameters," associated with successfully completing bank account transactions in various countries using multiple currency types. Specifically, the validation database 120 may be managed by the spend management system 100 and may store the bank account data parameters within one or more entries, or "country block entries," corresponding to respective country identifiers. In one embodiment, bank account data parameters of a given country block entry stored in validation database 120 may correspond to a country in which a supplier bank account is located (e.g., as indicated by a country identifier). For example, bank account data parameters of a country block entry for the United States may include account number and routing number parameters, thereby indicating that account number and routing number information may typically be required for completing bank account transactions in the United States using a USD currency type. Bank account data parameters of a given country block entry stored in validation database 120 may additionally correspond to a currency type associated with a supplier bank account transaction (e.g., as indicated by a currency identifier). In the example described above, bank account data parameters of the country block entry for the United States may additionally include, or be updated to include, wire routing number and bank code parameters if the bank account transaction requires a EUR currency type rather than USD. In one embodiment, each bank account data parameter stored in validation database 120 may be or include a regular expression used to define a respective search pattern for supplier data received via the spend management interface 110. That is, the validation subsystem 130 may use the search pattern corresponding to the regular expression for each bank account data parameter to validate supplier data.

In one embodiment, the validation database 120 may be represented by one or more versions (e.g., version 1.0, 2.0, and the like). Here, bank account data parameters of a given country block entry stored in validation database 120 may additionally correspond to a respective version of the validation database 120 that the validation subsystem 130 uses to validate supplier data. Each respective version of the validation database 120 may correspond to a respective version of the spend management system 100, and/or spend management interface 110 therein, and may provide different degrees of supplier data validation. For example, a legacy version of the validation database 120 in use for 10 years or more may provide less strict supplier data validation than a newer version of the validation database 120 in use for less than 10 years. That is, each bank account parameter stored in previous versions of the validation database 120 may be or include a regular expression used to define a respective search pattern for supplier data that may result in a more lenient search than regular expressions comprising bank account data parameters stored in newer versions of the validation database 120. In one embodiment, the spend management system 100 may allow buyer computers 160 to elect, or otherwise opt-in, to using an updated version of the validation database 120 for performing advanced supplier data validation or to remain using previous versions of the validation database 120 for performing less strict supplier data validations. In one embodiment, the validation database 120 may be or include a relational database in which bank account data parameters are digitally stored within one or more country block entries as described above. In other embodiments, the validation database 120 may be or include a centralized database, distributed database, commercial database, operational database, and/or any other database management system suitable for storing invoices generated by the supplier computers 150.

In one embodiment, the validation subsystem 130 may comprise a system, device, or apparatus executing stored program instructions that are programmed to validate supplier data provided by supplier computers 150. In one embodiment, the validation subsystem 130 may be programmed to access the spend management interface 110 of the spend management system 100 such that the validation subsystem 130 may receive supplier data from supplier computers 150 via user interface widgets electronically presented within the spend management interface 110. Specifically, the validation subsystem 130 may receive a country identifier indicating a country in which a supplier bank account is located via a country widget electronically presented within the spend management interface 110. The validation subsystem 130 may additionally receive a currency identifier indicating a currency type associated with a supplier bank account transaction via a currency widget electronically presented within the spend management interface 110. In another embodiment, the spend management system 100 may be programmed to extract supplier data from the spend management interface 110 such that the country identifier and/or currency identifier may be accessed directly by the validation subsystem 130.

In one embodiment, the validation subsystem 130 may be programmed to identify one or more parameters of multiple bank account data parameters stored in validation database 120. In particular, the validation subsystem 130 may select a country block entry stored in the validation database 120 based on the country identifier received from the supplier computer 150 (e.g., via the country widget electronically presented within the spend management interface 110) and may identify parameters included in the country block entry accordingly. In one embodiment, the validation subsystem 130 may identify parameters included in the country block entry once the country block entry has been selected. For example, the validation subsystem 130 may receive a country identifier indicating the United States, select the country block entry corresponding to the United States, and identify account number and routing number parameters included in the country block entry. In another embodiment, the validation subsystem 130 may identify parameters included in the country block entry once the country block entry has been selected and a currency type has been identified. Here, the validation subsystem 130 may identify a currency type based on the currency identifier received from the supplier computer 150 (e.g., via the currency widget electronically presented within the spend management interface 110). In the example described above, the validation subsystem 130 may receive the country identifier indicating the United States, receive a currency identifier indicating a EUR currency type, select the country block entry corresponding to the United States, identify the EUR currency type indicated by the currency identifier, and identify the wire routing number and bank code parameters included in the country block entry based on the currency identifier. In one embodiment, the one or more parameters identified by the validation subsystem 130 may include a bank code, a routing number, and an account number. In other embodiments, the one or more parameters may additionally include a wire routing number, a Society for Worldwide Interbank Financial Telecommunication (SWIFT) code, an IBAN, a sort code, a Bank State Branch (BSB) code, an Indian Financial System Code (IFSC), a transit number, an institution number, and/or any suitable combination of parameters stored in validation database 120.

In one embodiment, the validation subsystem 130 may be programmed to generate one or more additional user interface widgets, or "customized user interface widgets," based on the one or more parameters identified by the validation subsystem 130. In particular, the validation subsystem 130 may identify one or more parameters included in country block entries stored in the validation database 120 as described above and may generate customized user interface widgets based on the one or more parameters. The customized user interface widgets generated by the validation subsystem 130 may be associated with all data values of supplier data necessary to correctly address a supplier bank account to complete a supplier bank account transaction. For example, upon identifying wire routing number and bank code parameters associated with a supplier bank account transaction in the United States using a EUR currency type, the validation subsystem 130 may generate customized user interface widgets configured to receive wire routing number and bank code information from a supplier computer 150. In this example, the wire routing number and bank code information may be subsequently used by a buyer computer 160 for correctly addressing the supplier bank account using the specified currency type to complete the supplier bank account transaction. In one embodiment, each customized user interface widget generated by the validation subsystem 130 may be comprised of a data field configured to receive supplier data having a proper syntax, format, and/or length corresponding to the parameters on which the customized user interface widget is based. For example, a customized user interface widget generated by the validation subsystem 130 to receive account number information from a supplier computer 150 for a supplier bank account transaction in the United States using a USD currency type may be configured to receive up to 17 numeric digits from the supplier computer 150.

In one embodiment, the validation subsystem 130 may be programmed to electronically update the spend management interface 110 to present the one or more customized user interface widgets to supplier computers 150. Specifically, the validation subsystem 130 may electronically update, or otherwise modify, the software framework comprising the spend management interface 110, and/or one or more graphical controls presented therein, to present the one or more customized user interface widgets to supplier computers 150. That is, the spend management interface 110 may be electronically updated to present the one or more customized user interface widgets rather than the one or more user interface widgets initially presented to the supplier computers 150 as described above with respect to the spend management interface 110. Once the spend management interface 110 has been electronically updated, the supplier computers 150 may manually enter supplier data into the spend management system 100 using the one or more customized user interface widgets.

In one embodiment, the validation subsystem 130 may programmatically validate the supplier data received via the one or more customized user interface widgets. As described above with respect to the validation database 120, each bank account data parameter stored in the validation database 120 may be or include a regular expression used to define a respective search pattern for supplier data received via the spend management interface 110. That is, the validation subsystem 130 may use the search pattern corresponding to the regular expression for each bank account data parameter to validate supplier data with respect to proper syntax, format, and/or length. Upon receiving supplier data via the one or more customized user interface widgets, the validation subsystem 130 may use the regular expressions corresponding to the one or more parameters upon which the one or more customized user interface widgets are based to programmatically validate the supplier data. In particular, the validation subsystem 130 may use the search pattern for each of the regular expressions corresponding to the one or more parameters to programmatically match the search pattern to respective target strings comprising the supplier data. In one embodiment, the validation subsystem 130 may programmatically validate supplier data using Basic Regular Expressions (BRE). In other embodiments, the validation subsystem 130 may programmatically validate supplier data using Extended Regular Expressions (ERE), Simple Regular Expressions (SRE), and/or any combination of regular expressions suitable for validating supplier data.

In one embodiment, the validation subsystem 130 may programmatically verify the supplier data received via the one or more customized user interface widgets. That is, in addition to validating supplier data with respect to proper syntax, format, and/or length as described above, the validation subsystem 130 may verify that a supplier bank account is a valid account. Upon receiving a supplier routing number via a customized user interface widget electronically presented within the spend management interface 110, the validation subsystem 130 may access a list, or directory, of valid routing numbers (e.g., American Bankers Association (ABA) directory) and may programmatically match the supplier routing number to a valid routing number included in the list of valid routing numbers. In this way, the validation subsystem 130 may, both, validate supplier data provided by supplier computers 150 with respect to proper syntax, format, and/or length and verify that the validated supplier data is accessible to buyers for completing bank account transactions. In one embodiment, the list, or directory, of valid routing numbers may be stored in the validation database 120.

Network 140 may be implemented by any medium or mechanism that provides for the exchange of data between the various elements of FIG. 1. Examples of network 140 include, without limitation, a cellular network, communicatively coupled with a data connection to the computing devices over a cellular antenna, one or more Local Area Networks (LANs), one or more Wide Area Networks (WANs), one or more Ethernets or the Internet, or one or more terrestrial, satellite or wireless links, or a combination thereof. For purposes of illustrating a clear example, network 140 is shown as a single element but in practice, network 140 may comprise one or more local area networks, wide area networks, and/or internetworks. The various elements of FIG. 1 may also have direct (e.g., wired or wireless) communications links, depending upon a particular implementation.

2.2 User Interface Example

Figure 2A:
Figures 2B, 2C:
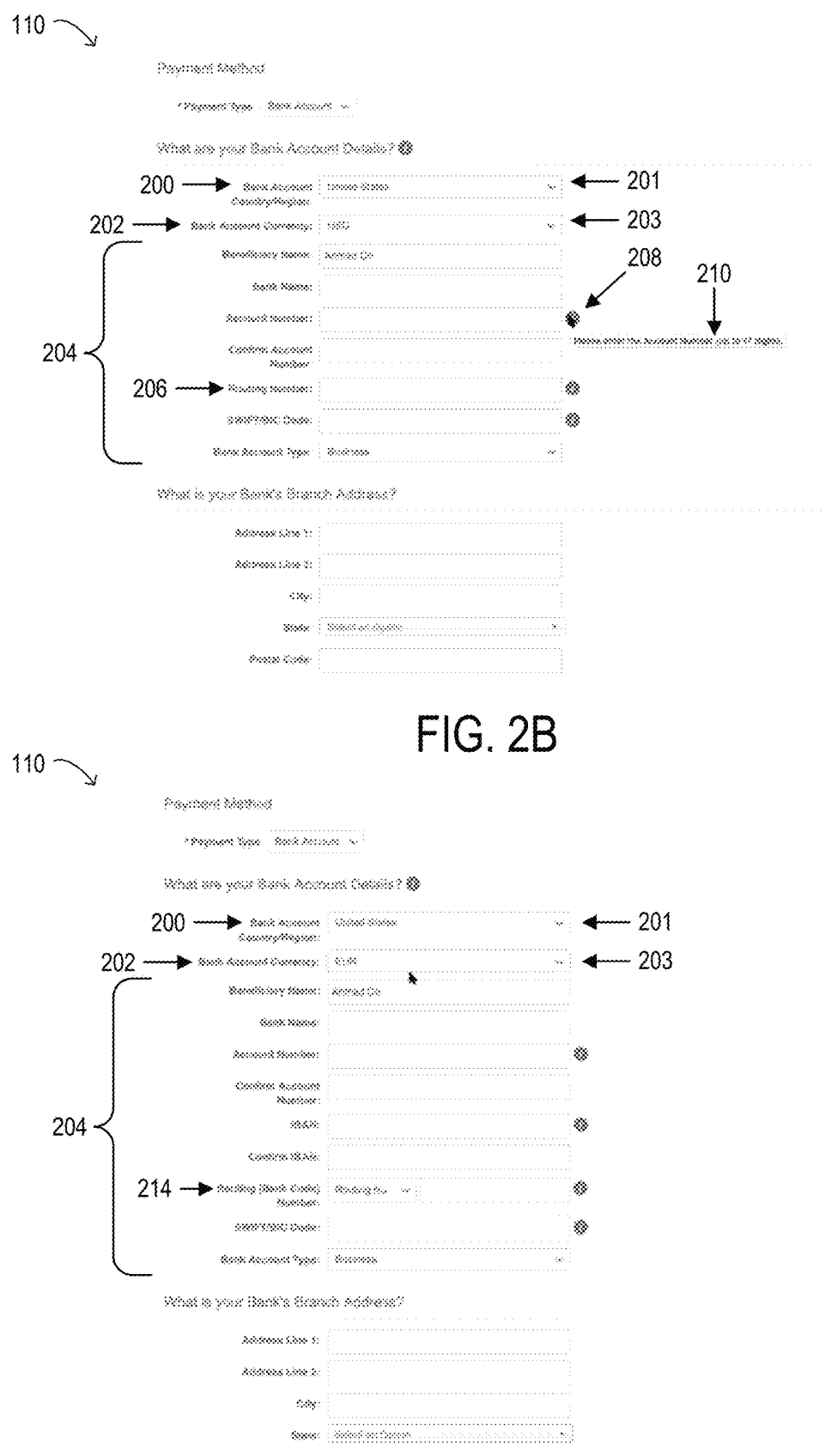

FIG. 2A, FIG. 2B, FIG. 2C illustrate an example spend management interface of a spend management system, according to various embodiments. In this context, "supplier data" refers to electronic information, or a digital dataset, that is digitally stored in an electronic storage device and managed programmatically using the techniques that are described herein in other sections.

Embodiments may use graphical user interfaces that buyer computers or supplier computers render based on dynamically generated markup language code that is locally executed at the buyer computers or supplier computers. In the embodiment illustrated in FIG. 2A, the spend management interface 110 has been rendered at a buyer computer based on receiving markup language code from a spend management system instance, and includes a country widget 200 configured to receive a country identifier 201 from a supplier computer 150 (shown in FIG. 1), a currency widget (not shown in figure) configured to receive a currency identifier (not shown in figure) from a supplier computer 150, and multiple user interface widgets 204 electronically presented within the spend management interface 110. As shown in FIG. 2A, the user interface widgets 204 may include a "Beneficiary Name" widget, a "Bank Name" widget, an "Account Number" widget, a "Confirm Account Number" widget, a "Routing Number" widget, a "SWIFT/BIC Code" widget, and a "Bank Account Type" widget. It is noted that other embodiments of the spend management interface 110 may include additional, fewer, and/or different user interface widgets than those illustrated in FIG. 2A.

In one embodiment, a supplier computer 150 may access the spend management interface 110 and a supplier may manually enter a country identifier 201 into the spend management system 100 via the country widget 200. This is shown in FIG. 2A where a supplier using a supplier computer 150 has selected "United States" from a drop-down menu listing multiple countries alphabetically. In other embodiments, suppliers may manually enter country identifiers 201 into the spend management system 100 via a country widget 200 having a plain text field, hover menu, pull-down list, picklist, and/or any combination of widgets suitable for receiving a country identifier 201 from supplier computers 150.

FIG. 2B illustrates the example spend management interface 110 shown in FIG. 2A. In the example shown in FIG. 2B, the spend management interface 110 is in a state where the supplier has selected the country identifier 201 from the drop-down menu shown in FIG. 2A. Specifically, the currency widget 202 and currency identifier 203 are visible within the spend management interface 110 in addition to hint icons 208 and suggestion 210. As shown in FIG. 2B, the currency identifier 203 in the currency widget 202 indicates a USD currency type. In one embodiment, the currency identifier 203 may autofill the currency widget 202 to a default currency type representative of the country in which the supplier bank account is located (i.e., as indicated by the country identifier 201). For example, upon receiving the country identifier 201 from a supplier computer 150, the validation subsystem 130 may select a country block entry stored in the validation database 120 based on the country identifier 201, identify a parameter indicating a currency type included in the country block entry, and autofill the currency widget 202 with the currency type indicated by the parameter. In another embodiment, a supplier may access a list of available currency types via the spend management interface 110. For example, a supplier may access a drop-down menu listing multiple currency types alphabetically, similar to the drop-down menu shown in FIG. 2A. In other embodiments, suppliers may manually enter currency identifiers 203 into the spend management system 100 via a currency widget 202 having a plain text field, hover menu, pull-down list, picklist, and/or any combination of widgets suitable for receiving a currency identifier 203 from supplier computers 150.

As shown in FIG. 2B, the spend management interface 110 may include one or more hint icons 208 disposed proximate to one or more user interface widgets 204. Each hint icon 208 electronically presented within the spend management interface 110 may be programmed to provide suppliers with suggestions 210 regarding an expected format of supplier data (e.g., with respect to syntax, length, and the like) to be manually entered by suppliers. Each suggestion 210 provided to suppliers using hint icons 208 may correspond to the user interface widget next to which the hint icon 208 is presented. In the example shown in FIG. 2B, the suggestion 210 "Please enter the Account Number (up to 17 digits)" is presented proximate to the "Account Number" widget, indicating that the suggestion 210 corresponds to a supplier account number. In one embodiment, a supplier computer 150 may initiate a request to receive suggestions 210, or a "hint request," by simply clicking on, hovering over, or otherwise engaging with, hint icons 208 electronically presented within the spend management interface 110. In response to receiving the hint request via hint icons 208, the validation subsystem 130 may access the validation database 120 and identify a suggestion 210 based on the user interface widget next to which the hint icon 208 is presented. For example, suggestions 210 may be stored in validation database 120 using a string format, where each suggestion 210 may be indexed based on the user interface widget to which the suggestion 210 corresponds. Once the suggestion 210 has been identified, the validation subsystem 130 may electronically present the suggestion 210 to the supplier computer 150 via the spend management interface 110 as shown in FIG. 2B.

FIG. 2C illustrates the example spend management interface 110 shown in FIG. 2A and FIG. 2B. In the example shown in FIG. 2C, the spend management interface 110 is in a state where the supplier has selected a different currency identifier 203 than that shown in FIG. 2B. Specifically, the supplier has changed the currency identifier 203 from a USD currency type to a EUR currency type. In response to a change in currency type, the validation subsystem 130 may electronically update, or otherwise modify, the software framework comprising the spend management interface 110 to present one or more customized user interface widgets based on one or more parameters stored in validation database 120 as described above with respect to FIG. 1. This is shown in FIG. 2C where the spend management interface 110 includes a "Routing (Bank Code) Number" widget 214 rather than the "Routing Number" widget 206 shown in FIG. 2B. Once the spend management interface 110 has been electronically updated, the supplier may manually enter supplier data into the spend management system 100 using the one or more customized user interface widgets. In this way, the validation subsystem 130 may ensure that the supplier data received via the spend management interface 110 corresponds to the appropriate country identifier 201 and currency identifier 203 for receiving payments. Presenting buyers with this accurate supplier data may prevent, both, failures to accurately integrate supplier data across multiple spend management systems accessed by buyers and costly bounced payments from banks due to buyers attempting to inaccurate supplier data.

2.3 Supplier Data Validation Example

Figures 3A, 3B:
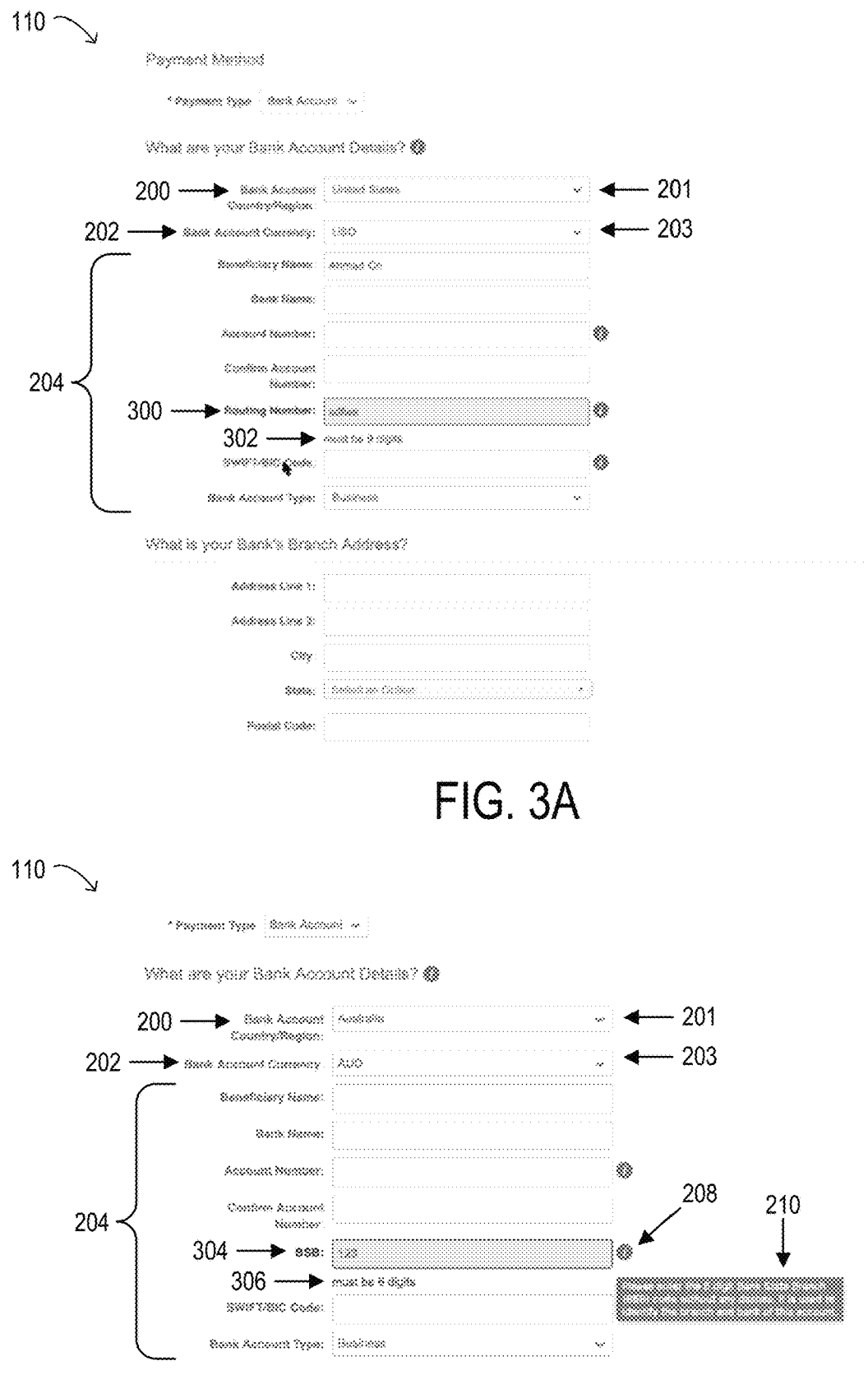

FIG. 3A and FIG. 3B illustrate an example spend management interface that includes an error notification, according to various embodiments. In this context, "error notification" refers to electronic information, or a digital dataset, that is digitally stored in an electronic storage device and managed programmatically using the techniques that are described herein in other sections. In one embodiment, the validation subsystem 130 may access the validation database 120 and identify error notifications based on one or more user interface widgets 204 that have received invalid supplier data. For example, error notifications may be stored in validation database 120 using a string format, where each error notification may be indexed based on the user interface widget to which the error notification corresponds.

FIG. 3A illustrates the example spend management interface 110 shown in FIG. 2A, FIG. 2B, FIG. 2C. As shown in FIG. 3A, the country identifier 201 in the country widget 200 indicates the United States and the currency identifier 203 in the currency widget 202 indicates a USD currency type.

Because routing number information may typically be required for completing bank account transactions in the United States using a USD currency type, the validation subsystem 130 has electronically updated the spend management interface 110 to present one or more customized user interface widgets that include a "Routing Number" widget 300. In the example shown in FIG. 3A, the spend management interface 110 is in a state where a supplier using a supplier computer 150 has attempted to manually enter a routing number into the "Routing Number" widget 300. However, an error notification 302 has been electronically presented within the spend management interface 110. Specifically, the error notification 302 "must be 9 digits" has been presented proximate to the "Routing Number" widget 300, indicating that the routing number manually entered by the supplier is invalid. To electronically present the error notification 302 within the spend management interface 110, the validation subsystem 130 may first attempt to validate the routing number manually entered into the "Routing Number" widget 300 by the supplier. In particular, the validation subsystem 130 may use the regular expression corresponding to the routing number parameter included in the country block entry corresponding to the country identifier 201 (i.e., the United States) and currency identifier 203 (i.e., USD currency type) to programmatically validate the supplier data. Upon determining that the supplier data received from the supplier computer 150 via the "Routing Number" widget 300 is invalid, the validation subsystem 130 may then electronically present the error notification 302 to the supplier computer 150 indicating that the supplier data received is invalid.

FIG. 3B illustrates the example spend management interface 110 shown in FIG. 2A, FIG. 2B, FIG. 2C, FIG. 3A. As shown in FIG. 3B, the country identifier 201 in the country widget 200 indicates Australia and the currency identifier 203 in the currency widget 202 indicates an Australian dollar (AUD) currency type. Because BSB information may typically be required for completing bank account transactions in Australia using an AUD currency type, the validation subsystem 130 has electronically updated the spend management interface 110 to present one or more customized user interface widgets that include a "BSB" widget 304. In the example shown in FIG. 3B, the spend management interface 110 is in a state where a supplier using a supplier computer 150 has attempted to manually enter a BSB code into the "BSB" widget 304. However, an error notification 306 has been electronically presented within the spend management interface 110. In particular, the error notification 306 "must be 6 digits" has been presented proximate to the "BSB" widget 304, indicating that the BSB code manually entered by the supplier is invalid. To electronically present the error notification 306 within the spend management interface 110, the validation subsystem 130 may first attempt to validate the BSB code manually entered into the "BSB" widget 304 by the supplier. In particular, the validation subsystem 130 may use the regular expression corresponding to the BSB parameter included in the country block entry corresponding to the country identifier 201 (i.e., Australia) and the currency identifier 203 (i.e., AUD currency type) to programmatically validate the supplier data. Upon determining that the supplier data received from the supplier computer 150 via the "BSB" widget 304 is invalid, the validation subsystem 130 may then electronically present the error notification 306 to the supplier computer 150 indicating that the supplier data received is invalid.

3. Functional Overview

Figure 4:
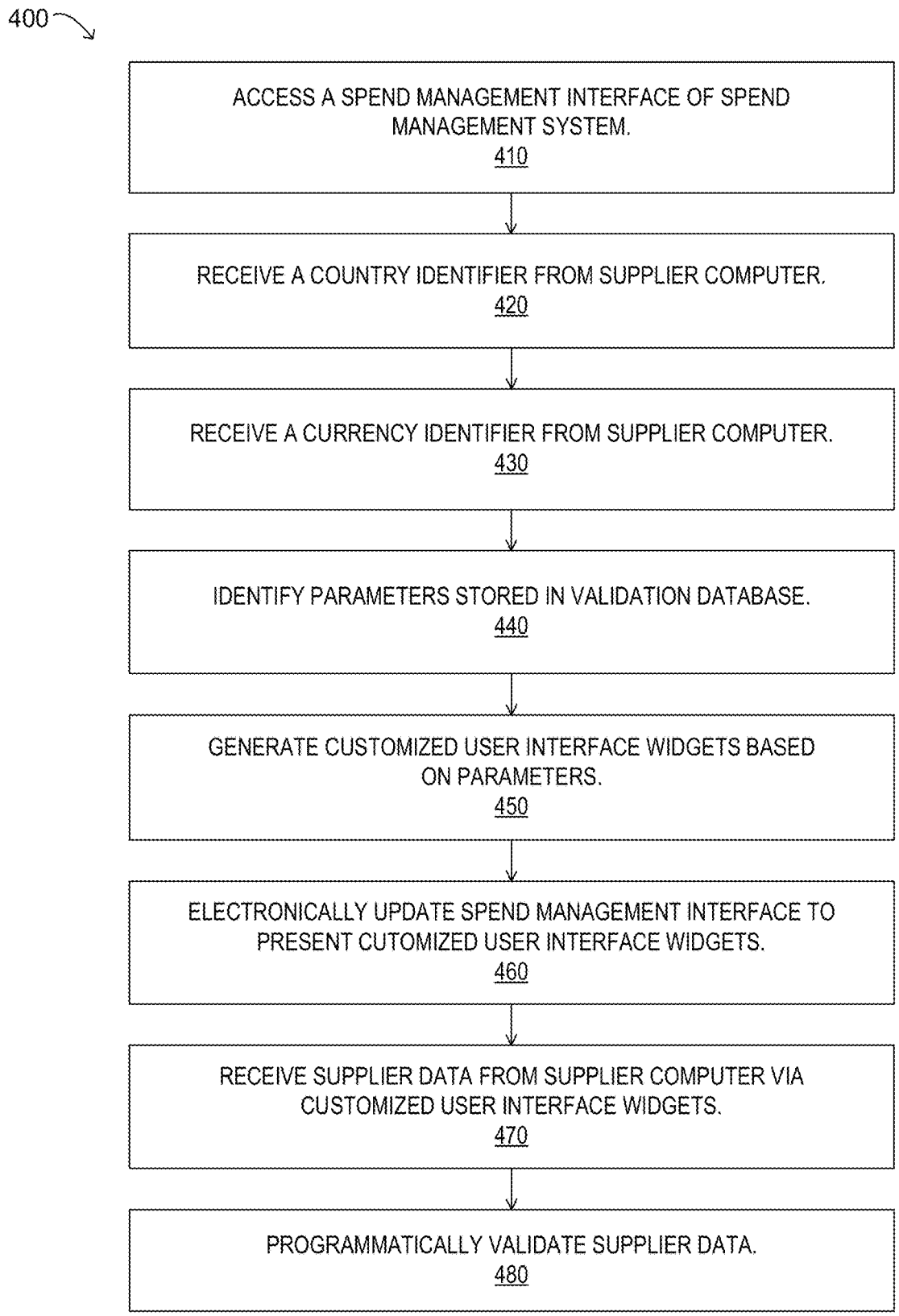
FIG. 4 illustrates a flow diagram of an algorithm that may be programmed to implement an embodiment.

FIG. 4 illustrates a flow diagram of an algorithm that may be programmed to implement an embodiment. FIG. 4, and the other drawing figures and all of the description and claims in this disclosure, are intended to present, disclose and claim a technical system and technical methods in which specially programmed computers, using a special-purpose distributed computer system design, execute functions that have not been available before to provide a practical application of supplier data validation using a validation subsystem. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

As an overview, the process of FIG. 4 is generally directed to a method for validating supplier data. The method may begin at step 410, where the process may be programmed to access a spend management interface of a spend management system. The spend management interface may be programmed to receive supplier data from a supplier computer via one or more user interface widgets of the spend management interface. For example, the validation subsystem 130 shown in FIG. 1 may access the spend management interface 110 that includes user interface widgets 204 as shown in FIG. 2A.

At step 420, the process may be programmed to receive a country identifier from the supplier computer via a country widget of the one or more user interface widgets. The country identifier may indicate a country in which a supplier bank account is located. For example, the validation subsystem 130 may receive the country identifier 201 via the country widget 200 indicating the United States as shown in FIG. 2B.

At step 430, the process may be programmed to receive a currency identifier from the supplier computer via a currency widget of the one or more user interface widgets. The currency identifier may indicate a currency type associated with a supplier bank account transaction. For example, the validation subsystem 130 may receive the currency identifier 203 via the currency widget 202 indicating a USD currency type as shown in FIG. 2B.

At step 440, the process may be programmed to identify one or more parameters of multiple bank account data parameters stored in a validation database of the spend management system. The one or more parameters may be associated with the country identifier and the currency identifier. For example, the validation subsystem 130 may identify one or more parameters of multiple bank account data parameters stored in validation database shown in FIG. 1. The one or more parameters may be associated with the country identifier 201 and the currency identifier 203 shown in FIG. 2A. In one embodiment, the one or more parameters identified by the validation subsystem 130 may include a bank code, a routing number, and an account number. In other embodiments, the one or more parameters may additionally include a wire routing number, a Society for Worldwide Interbank Financial Telecommunication (SWIFT) code, an IBAN, a sort code, a Bank State Branch (BSB) code, an Indian Financial System Code (IFSC), a transit number, an institution number, and/or any suitable combination of parameters stored in validation database 120 shown in FIG. 1.

At steps 450 and 460, the process may be programmed to generate one or more customized user interface widgets based on the one or more parameters and to electronically update the spend management interface to present the one or more customized user interface widgets to the supplier computer, respectively. The one or more customized user interface widgets may be associated with all data values of the supplier data necessary to correctly address the supplier bank account for the supplier bank account transaction. For example, the validation subsystem 130 may generate the "Routing Number" widget 206 shown in FIG. 2B to receive routing number information necessary for completing bank account transactions in the United States using a USD currency type. In another example, the validation subsystem 130 may generate the "Routing (Bank Code) Number" widget 214 shown in FIG. 2C to receive wire routing number and bank code information necessary for completing bank account transactions in the United States using a EUR currency type.

At steps 470 and 480, the process may be programmed to receive the supplier data from the supplier computer via the one or more customized user interface widgets and to programmatically validate the supplier data. For example, the validation subsystem 130 may receive routing number information via the "Routing Number" widget 300 shown in FIG. 3A. The validation subsystem 130 may use the regular expression corresponding to the routing number parameter included in the country block entry corresponding to the country identifier 201 (i.e., the United States) and currency identifier 203 (i.e., USD currency type) to programmatically validate the supplier data as described above with respect to FIG. 3A. In another example, the validation subsystem 130 may receive BSB information via the "BSB" widget 304 shown in FIG. 3B. The validation subsystem 130 may use the regular expression corresponding to the BSB parameter included in the country block entry corresponding to the country identifier 201 (i.e., Australia) and the currency identifier 203 (i.e., AUD currency type) to programmatically validate the supplier data as described above with respect to FIG. 3B.

Using these approaches, embodiments provide the benefit of a technical solution to the technical problems identified in the Background in at least the following manner. First, electronically presenting one or more user interface widgets within the user interface of a spend management system that represent specific syntax requirements corresponding to the country in which a supplier bank account is located and/or the given currency type associated with a supplier bank account transaction may encourage suppliers to manually enter accurate supplier data into the spend management system. Thus, the accurate supplier data may be more readily integrated across multiple spend management systems accessed by buyers (e.g., enterprise resource planning (ERP) platforms) for making payments to suppliers. This may greatly reduce instances of costly bounced payments from banks due to buyers attempting to use inaccurate supplier data for supplier bank account transactions. Second, the security and resistance to fraud of a spend management system, e-procurement system, or invoice processing system are improved because the automatic stored program techniques described herein will reduce the quantity of inaccurate supplier data that a supplier can generate, thereby deterring buyers from seeking new mechanisms for supplier data validation (e.g., third-party software) which may expose sensitive data and present opportunities for fraud and/or disruptions in supplier bank account transactions. Third, reductions in the number of CPU cycles, memory, storage, network bandwidth, and other resources are achieved because the automatic stored program techniques described herein may prevent the storage and incorrect processing of inaccurate supplier data that has been created in a spend management system, e-procurement system, or invoice processing system erroneously or intentionally.

4. Implementation Example—Hardware Overview

Figure 5:
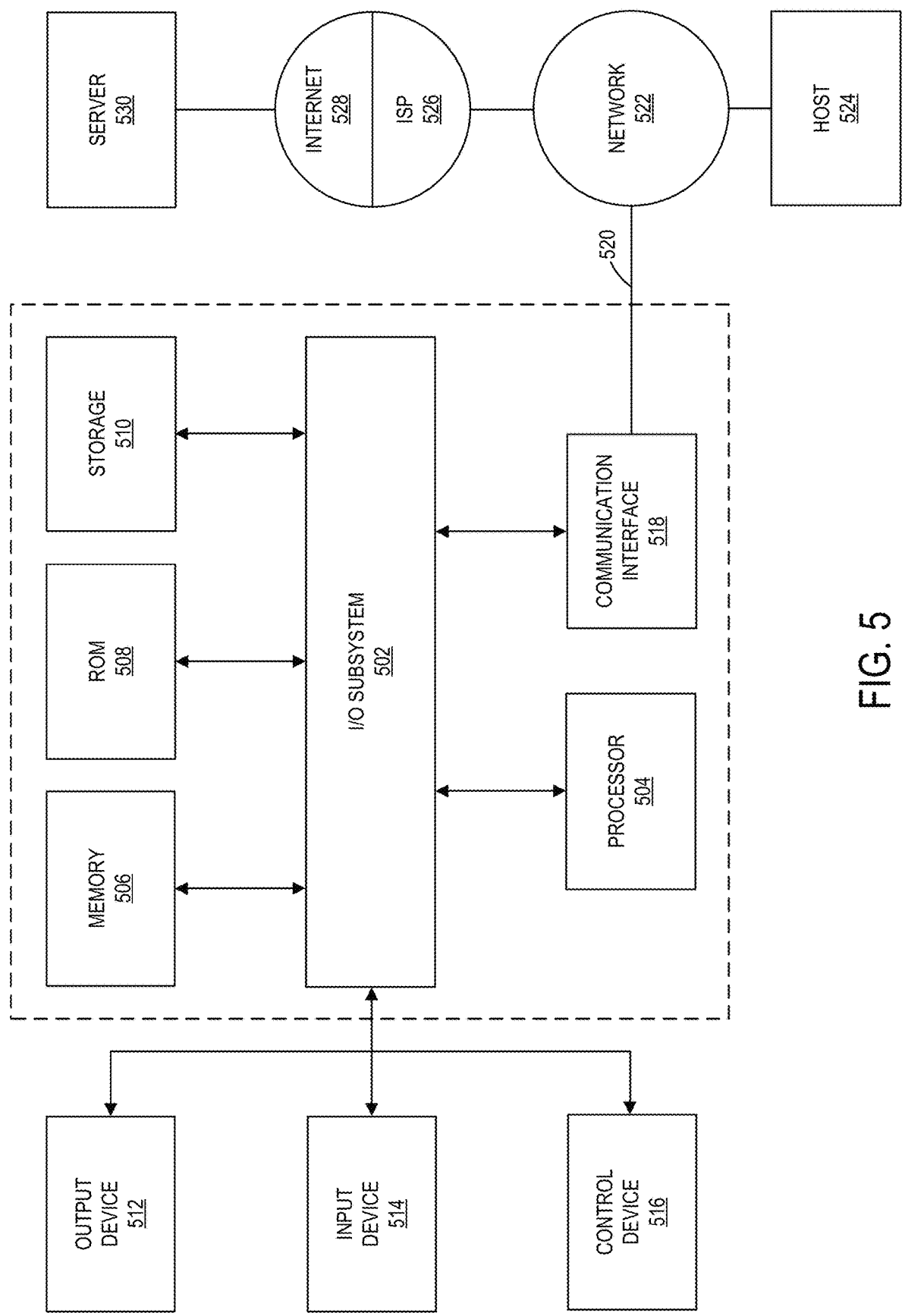
FIG. 5 illustrates a computer system that may be used to implement embodiments.

FIG. 5 is a block diagram that illustrates an example computer system with which an embodiment may be implemented. In the example of FIG. 5, a computer system and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system includes an input/output (I/O) subsystem 502 which may include a bus and/or other communication mechanism(s) for communicating information and/or instructions between the components of the computer system over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system into a special-purpose machine that is customized to perform the operations specified in the instructions.

Computer system further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on output device 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system. Output device 512 may include hardware, software, firmware and interfaces for generating position reporting packets, notifications, pulse or heartbeat signals, or other recurring data transmissions that specify a position of the computer system, alone or in combination with other application-specific data, directed toward host 524 or server 530.

Computer system may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infrared data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system can receive the data on the communication link and convert the data to a format that can be read by computer system. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system also includes a communication interface 518 coupled to network 522. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system can send messages and receive data and instructions, including program code, through the network(s), network link 520 and communication interface 518. In the Internet example, a server 530 might transmit a requested code for an application program through internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

5. Benefits; Extensions and Alternatives

Embodiments provide the benefit of a technical solution to the technical problems identified in the Background in at least the following manner. First, electronically presenting one or more user interface widgets within the user interface of a spend management system that represent specific syntax requirements corresponding to the country in which a supplier bank account is located and/or the given currency type associated with a supplier bank account transaction may encourage suppliers to manually enter accurate supplier data into the spend management system. Thus, the accurate supplier data may be more readily integrated across multiple spend management systems accessed by buyers (e.g., enterprise resource planning (ERP) platforms) for making payments to suppliers. This may greatly reduce instances of costly bounced payments from banks due to buyers attempting to use inaccurate supplier data for supplier bank account transactions. Second, the security and resistance to fraud of a spend management system, e-procurement system, or invoice processing system are improved because the automatic stored program techniques described herein will reduce the quantity of inaccurate supplier data that a supplier can generate, thereby deterring buyers from seeking new mechanisms for supplier data validation (e.g., third-party software) which may expose sensitive data and present opportunities for fraud and/or disruptions in supplier bank account transactions. Third, reductions in the number of CPU cycles, memory, storage, network bandwidth, and other resources are achieved because the automatic stored program techniques described herein may prevent the storage and incorrect processing of inaccurate supplier data that has been created in a spend management system, e-procurement system, or invoice processing system erroneously or intentionally.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method by a spend management system comprising a validation database, the method comprising:
   storing, by the spend management system, a plurality of country block entries in the validation database, wherein each country block entry of the plurality of country block entries includes a bank code parameter and a wire routing number and each of the bank code parameters comprises a regular expression with an associated search pattern;
   generating and displaying, by the spend management system, a spend management interface comprising a plurality of user interface widgets including a country widget and a currency widget;
   receiving, by the spend management interface, via the country widget, a country identifier from a supplier computer;
   receiving, by the spend management interface, via the currency widget, a currency identifier from the supplier computer;
   selecting, by the spend management system, based on the country identifier, a country block entry from the plurality of country block entries and selecting, by the spend management system, a bank code parameter and wire routing number from the selected country block entry;
   autofilling, by the spend management interface, one or more user interface widgets among the plurality of user interface widgets with the wire routing number and bank code parameters and generating, by the spend management interface, a user interface comprising the autofilled widgets;
   displaying, by the spend management interface, the user interface;
   receiving, by the displayed user interface, supplier data via the autofilled widgets;
   validating, by the spend management interface, based on the search pattern associated with the regular expression of the selected bank code parameter and wire routing number, the supplier data received via the autofilled widgets; and
   transmitting, by the spend management interface, the validated supplier data to a plurality of spend management systems.

2. The method of claim 1, further comprising:
   identifying, by the spend management system, a currency type, wherein the currency type is associated with the currency identifier; and
   determining, by the spend management system, each of the bank code parameter and wire routing parameter in a corresponding country block entry based on the currency identifier.

3. The method of claim 1, further comprising:
   displaying, by the spend management interface, one or more hint icons and receiving, by the spend management interface, a hint request from the supplier computer, via the displayed one or more icons;
   electronically presenting, by the spend management interface, a suggestion associated with the one or more hint icons.

4. The method of claim 1, each country block entry of the plurality of country block entries further including an account number, the method further comprising:
   storing, by the validation database, a list of valid routing numbers;
   verifying, by the spend management interface, that the account number is a valid account number utilizing the list of valid routing numbers.

5. One or more computer-readable non-transitory storage media embodying software that when executed by a processor of a spend management system including a validation database, causes the processor to perform the steps of:
   storing a plurality of country block entries in the validation database, wherein each country block entry of the plurality of country block entries includes a bank code parameter and a wire routing number and each of the bank code parameters comprises a regular expression with an associated search pattern;
   generating and displaying a spend management interface comprising a plurality of user interface widgets comprising a country widget and a currency widget;
   receiving, in the spend management interface, via the country widget, a country identifier from a supplier computer;
   receiving, in the spend management interface, via the currency widget, a currency identifier from the supplier computer;
   selecting based on the country identifier, a country block entry from the plurality of country block entries and selecting a bank code parameter and wire routing number from the selected country block entry;
   autofilling one or more user interface widgets of the plurality of user interface widgets with the wire routing number and bank code parameters and generating, by the spend management interface, a user interface comprising the autofilled widgets;

displaying the user interface;
receiving supplier data via the autofilled widgets;
validating based on the search pattern associated with the regular expression of the selected bank code parameter and wire routing number, the supplier data received via the autofilled widgets; and
transmitting the validated supplier data to a plurality of spend management systems.

6. The one or more computer-readable non-transitory storage media of claim 5, wherein the software when executed by the processor performs the steps of:
identifying a currency type, wherein the currency type is associated with the currency identifier; and
determining each of the bank code parameter and wire routing parameter in a corresponding country block entry based on the currency identifier.

7. The one or more computer-readable non-transitory storage media of claim 5, wherein the software when executed by the processor performs the steps of:
determining that the supplier data received via the autofilled widgets is invalid; and
electronically presenting an error notification to the supplier computer indicating that the supplier data is invalid.

8. The one or more computer-readable non-transitory storage media of claim 5, wherein the software when executed by the processor performs the steps of:
displaying one or more hint icons and receiving a hint request from the supplier computer, via the displayed one or more icons; and
electronically presenting a suggestion associated with the one or more hint icons.

9. The one or more computer-readable non-transitory storage media of claim 5, each country block entry of the plurality of country block entries further including an account number; and wherein the software when executed by the processor performs the steps of: storing a list of valid routing numbers in the validation database and verifying that the account number is a valid account number utilizing the list of valid routing numbers.

* * * * *